United States Patent [19]

Takeuchi et al.

[11] Patent Number: 4,858,103
[45] Date of Patent: * Aug. 15, 1989

[54] FLUID VALVE CONTROL SYSTEM FOR CONTROLLING FLUID PRESSURE OR FLOW

[75] Inventors: Kunihiko Takeuchi, Kawasaki; Kiyoshi Hayashi; Yasuo Shimomura, both of Tokyo, all of Japan

[73] Assignee: Tokyo Keiki Company, Ltd., Tokyo, Japan

[*] Notice: The portion of the term of this patent subsequent to Jul. 9, 2002 has been disclaimed.

[21] Appl. No.: 576,924

[22] Filed: Feb. 3, 1984

[30] Foreign Application Priority Data

Feb. 7, 1983 [JP] Japan .................................. 58-18651
Feb. 23, 1983 [JP] Japan .................................. 58-29052
Mar. 17, 1983 [JP] Japan .................................. 58-45057

[51] Int. Cl.[4] .......................................... G05B 11/32
[52] U.S. Cl. ..................................... 364/174; 364/191; 364/139; 318/696; 318/568.1; 251/129.05; 137/624.12; 137/624.2
[58] Field of Search ................ 364/191, 174, 139; 318/696, 568; 251/129, 131, 132; 137/624.11, 624.12, 624.18, 624.2

[56] References Cited

U.S. PATENT DOCUMENTS

| | | | |
|---|---|---|---|
| 4,156,170 | 5/1979 | Strunc | 318/696 |
| 4,250,544 | 2/1981 | Alley | 318/696 |
| 4,417,788 | 11/1983 | Makabe et al. | 318/696 |
| 4,429,268 | 1/1984 | Yajima et al. | 318/696 |
| 4,490,796 | 12/1984 | Bigbie et al. | 364/174 |
| 4,528,491 | 7/1985 | Takeuchi et al. | 318/568 |

*Primary Examiner*—Jerry Smith
*Assistant Examiner*—John R. Lastova
*Attorney, Agent, or Firm*—Wenderoth, Lind & Ponack

[57] ABSTRACT

Controlled variable table data, which consist of pulse number data corresponding to the maximum controlled variable of a fluid valve and divided into N divisions in each of which given pulse number data are set, are stored in a memory so that the sum of the given pulse number data in the N divisions may be equal to the number of pulses for giving a given controlled variable to the fluid valve. On the other hand, period table data, which consist of pulse interval data divided into divisions corresponding in number to the divisions of the controlled variable table data for determining a given control pattern, are stored in another memory. The fluid valve is controlled by successively generating pulses corresponding to the pulse number data in the individual divisions of the controlled variable table data at pulse intervals set in the individual divisions of the time length table data, driving a pulse motor by means of the generated pulses to control the flow rate and fluid pressure, counting the pulses, converting the count into an analog signal, thereby driving an actuator for the fluid valve.

6 Claims, 10 Drawing Sheets

20ms/scale
(T)

20ms/scale
(T)

10ms/scale
(T)

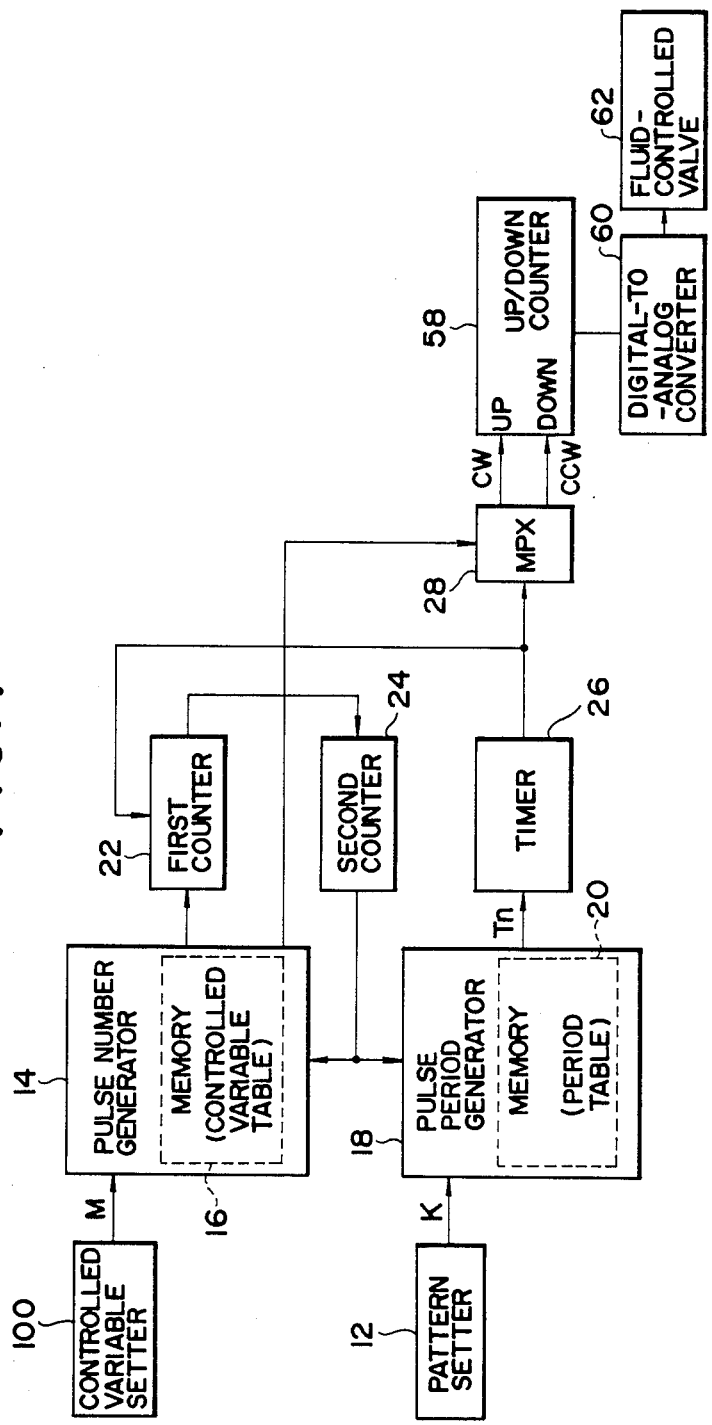

FLUID VALVE CONTROL SYSTEM FOR CONTROLLING FLUID PRESSURE OR FLOW

BACKGROUND OF THE INVENTION

1. Field of the Invention

The present invention relates to a fluid valve control system, which is adapted to freely set and control the control characteristics of the fluid valve by the generation of pulses based on stored table data.

2. Description of the Prior Art

Heretofore, a fluid-controlled valve has been controlled by a feedback control method utilizing an analog system. According to the feedback control method utilizing an analog system, however, control patterns for actuating a fluid-controlled valve so as to have a prescribed opening, i.e. the kinds of opening variations relative to the time base for switching a valve so as to have a prescribed opening, are limited to a linear pattern and an exponential function pattern which makes use of the charging and discharging of a capacitor. For this reason, it has been impossible to freely set a control pattern to meet the characteristics to be controlled.

In recent years, a valve whose opening can be adjusted by digital control, a so-called digital valve, has been made fit for practical use. Therefore, it has been made possible to optionally set a control pattern by the step control of a pulse motor.

However, since the conventional control systems for a digital valve are limited to either a constant speed control system using drive pulses of a constant frequency or a constant acceleration control system making the pulse interval of drive pulses variable, a control pattern has to be set by inputting via a keyboard, for example, the number of steps per unit time until the opening of the valve reaches the prescribed opening in order to freely set a control pattern, thereby making the setting of a pattern very complicated.

When the set opening is to be varied without changing the shape of a control pattern, it is necessary to redo a control pattern every time that a set opening is varied, thereby making it difficult to easily vary the set opening.

These problems are also applicable to a digital valve for use in pressure control, which utilizes a pulse motor for varying the set spring load of a relief valve.

On the other hand, fluid-controlled valves adopting the conventional analog system, such as servo valves, proportional control valves, for example, require a control accuracy which is as high as the aforementioned digital valves and must cause the control characteristics to be freely set in a manner similar to that of the digital valves.

In a hydraulic system using this kind of fluid-controlled valve, the control of a fluid is generally carried out automatically in accordance with the procedures for operating a programmable sequencer. However, a programmable sequencer is classified into two types, one type functioning so as to read a numerical value set by a switch of an operation panel, and then convert a decimal code into a binary code, and then issue an output, and the other type having no such function. In order to effect a digital control, a conversion into a binary code is required. A programmable sequencer of a simple type having no function for converting a decimal code into a binary code cannot be used in digital control without requiring modification thereto. Thus, digital control can be effected only with a programmable sequencer having the conversion function and raises a problem in that such sequences are not in wide use.

SUMMARY OF THE INVENTION

One object of the present invention is to provide a controlling device for a fluid valve which permits the desired control characteristics of the fluid valve to be obtained by generating pulses of a number corresponding to the controlled variable at a pulse interval corresponding to a control pattern.

Another object of the present invention is to provide a controlling device for a fluid valve which utilizes table data consisting of pulse number data for controlled variable divisions which altogether constitute a given controlled variable of the fluid valve and table data consisting of pulse interval data for determining the control speed for each of the aforementioned divisions, the two table data being provided as different data blocks.

Still another object of the present invention is to provide a controlling device for a fluid valve which permits a desired controlled variable and a desired control pattern to be optionally selected by specifying corresponding table data block numbers.

Yet another object of the present invention is to provide a controlling device for a fluid valve adapted to control the flow rate or pressure by driving a pulse motor with generated pulses.

A further object of the present invention is to provide a controlling device for a fluid valve adapted to calculate generated pulses and convert them into analog signals to drive an analog actuator of the fluid valve.

A still further object of the present invention is to provide a controlling device for a fluid valve which makes it possible to effect control based on high-level numerical treatment in accordance with table data irrespective of the fact as to whether or not a programmable sequencer has a function of converting a set output from a decimal code to a binary code and issuing an output.

The aforementioned objects and other objects, features and advantages of the present invention will become apparent from the following description taken in connection with the accompanying drawings.

BRIEF DESCRIPTION OF THE DRAWINGS

FIG. 4 is an explanatory view illustrating one example of the period table data of the present invention.

FIG. 7 is a block diagram illustrating another embodiment of the present invention, which is adapted to actuate a fluid-controlled valve of an analog system by means of pulses.

DETAILED DESCRIPTION OF THE PREFERRED EMBODIMENTS

Figure 1:
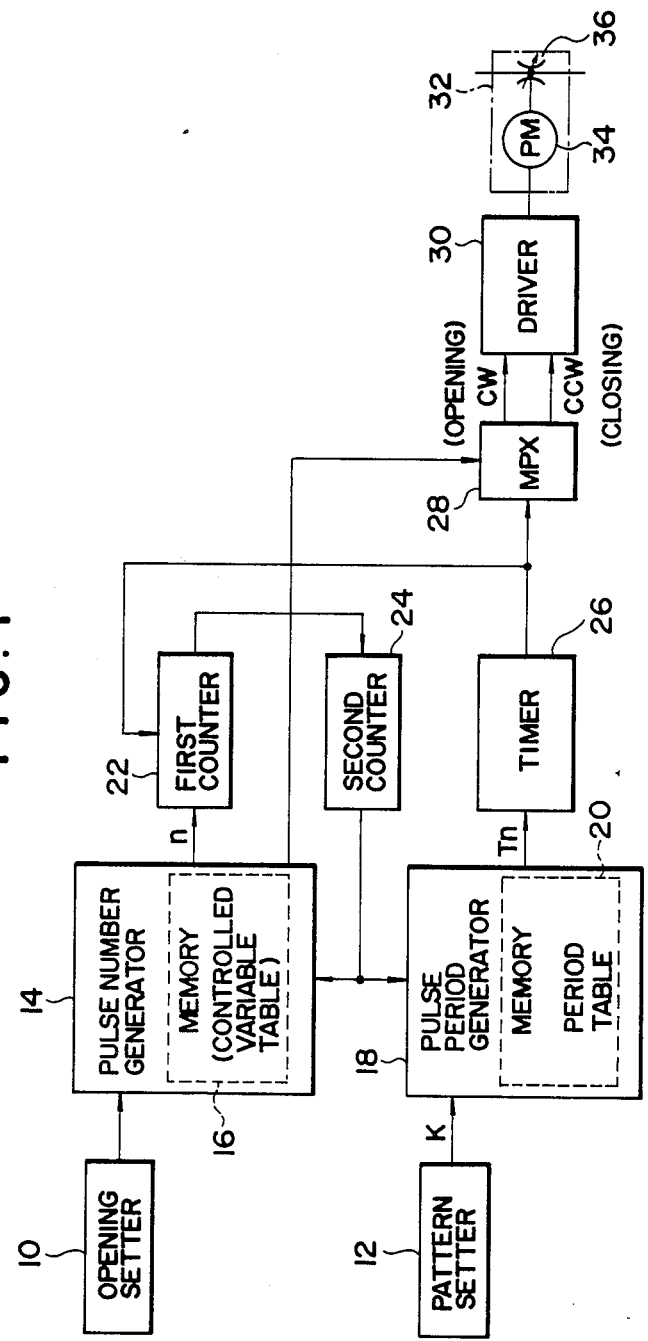
FIG. 1 is a block diagram illustrating one embodiment of the controlling device for a digital valve having a pulse motor according to the present invention.

FIG. 1 is a block diagram illustrating one embodiment of the controlling device for a fluid valve according to the present invention. This controlling device comprises an opening setter 10 for setting the opening M of a digital valve 32, and a pattern setter 12 for setting the control pattern K to allow the digital valve 32 to be actuated by the opening M set by the opening setter 10. The output of the opening setter 10 is supplied to a pulse number generator 14 which includes a memory 16 wherein there are stored controlled variable table data consisting of pulse number data $n_0$ to $n_9$ for N (N=10 in this embodiment) individual control divisions constituting the number of control pulses of a pulse motor 34 required for actuating the digital valve 32 as will be described later in detail.

The output of the pattern setter 12 is supplied to a pulse period generator 18 which generates pulse data for determining a pulse interval by which the switching speed of the digital valve 32 is set in accordance with the set control pattern K. In order to generate the pulse data, the pulse period generator 18 includes a memory 20, in which are stored period table data consisting of pulse interval data $T_0$ to $T_9$ of pulse motor driving pulses for N (N=10 in this embodiment) individual control divisions which altogether constitute the number of control pulses of the pulse motor 34 required for actuating the digital valve 32.

The output of the pulse number generator 14 is supplied to a first counter 22 which is an up/down counter. In the first counter 22 is preset a pulse number n which is read out of the controlled variable table in the memory 16 in the pulse number generator 14. The first counter 22 is adapted to count pulses issued from a timer 26 as will be described later in detail. As soon as the count of the first counter 22 reaches the preset number n, the first counter 22 issues its output to a second counter 24 in the subsequent stage. The second counter 24 issues its output when the number N of the divisions of the table data in the memory 16 or 20 is calculated to be 10 and consequently serves to reset the pulse number generator 14 and the pulse period generator 18.

On the other hand, the output of the pulse period generator 18 is supplied to the timer 26, which issues pulses of a uniform pulse width having a pulse interval corresponding to a pulse interval $T_n$ outputted from the pulse period generator 18 for driving the pulse motor 34. The output of the timer 26 is supplied to a multiplexer 28, which receives a signal for determining the direction of rotation of the pulse motor from the pulse number generator 14. In accordance with the rotational command signal, the multiplexer produces a CW pulse for rotating the pulse motor in the clockwise direction or a CCW pulse for rotating the pulse motor in the counterclockwise direction. Denoted by reference numeral 30 is a driver which is adapted to rotate the pulse motor 34 of the digital valve 32 on the basis of the pulse output issued from the multiplexer 28, thereby varying the opening of a throttle 36 with respect to control of a flow rate, for example.

The controlled variable table data stored in the memory 16 of the pulse number generator 14 and the period table data stored in the memory 20 of the pulse period generator 18 will be described hereinafter in detail.

Figure 2:
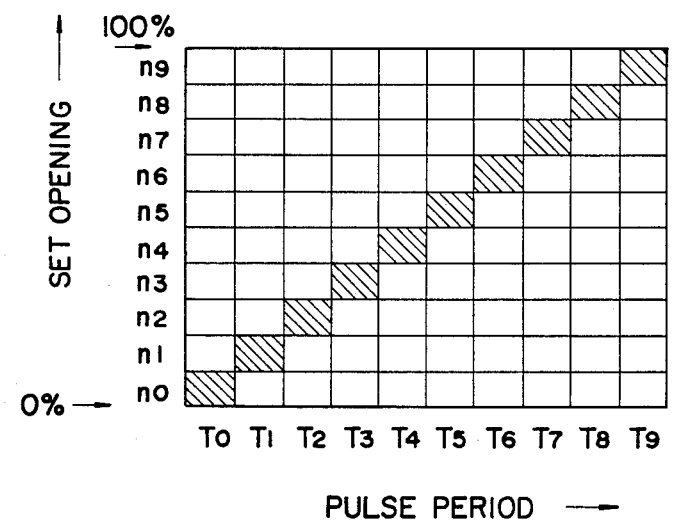
FIG. 2 is an explanatory view illustrating the principle underlying the formation of table data according to the present invention.

FIG. 2 is a graph illustrating the digital control characteristics in the control of the present invention, wherein the abscissa axis corresponds to the pulse interval and the ordinate axis corresponds to the valve opening. The valve opening M corresponding to the number of the displacement steps of the pulse motor is divided into 10 divisions as shown in FIG. 2 so as to respectively determine pulse numbers $n_0$ to $n_9$ in the 10 divisions. Subsequently, optional pulse intervals $T_0$ to $T_9$ for the pulse numbers $n_0$ to $n_9$ are respectively set. FIG. 2 exemplifies the case where $T_0 = T_1 = \ldots = T_9$. In general, a control characteristic curve is obtained by determining both the number of steps corresponding to M/N with respect to $n_0$ to $n_9$ on the longitudinal axis in the graph and the pulse intervals (acceleration) giving inclinations with respect to $T_0$ to $T_9$ on the lateral axis therein within each of the regions defined by intersections between the pulse numbers $n_0$ to $n_9$ and the pulse intervals $T_0$ to $T_9$ and shown by the hatched portions in FIG. 2, connecting the segments determined within the hatched regions to obtain a polygonal line, and forming a curve approximating the polygonal line.

In order to realize the characteristic curve as described above, in the present invention, 255 different blocks, obtained by setting the pulse numbers $n_0$ to $n_9$ in the 10 divisions of the set opening (control pulse number) M into which the longitudinal axis is divided so that M is varied from M=1 to M=255, are prepared as the controlled variable table data and, with respect to the pulse intervals shown on the lateral axis, a plurality of different pulse intervals $T_0$ to $T_9$ in each of the 10 divisions for time length are prepared as time length table data.

To be more specific, the controlled variable table data represent table data having a value obtained by dividing the set opening M by the number of the divisions (N=10), i.e. M/N, stored in 10 addresses. When the set opening M equals 20, for example, the following equation is satisfied.

$$M/10 = 20/10 = 2$$

In this case, data $n_0$ to $n_9 = 2$ are stored in the individual 10 addresses. However, when the set opening equals 32, the following equation is obtained.

$$M/10 = 32/10 = 3 \text{ with the remainder of } 2$$

That is to say, when the individual data are uniformly set at n=3, in this case, the remainder of 2 is left and, as a result, the set opening of M=32 cannot be covered. Therefore, when any remainder is left relative to the 10 divisions, such as when M=32, the number 32 is identified with $3\times 8 + 4\times 2$, thereby storing data of n=3 in eight addresses and data of n=4 in the remaining two addresses. Even when any remainder is left relative to the 10 divisions, as described above, it is set in the present invention that the set opening M equals $n_0 + n_1 + \ldots + n_9$.

On the other hand, the period table data represent table data having the pulse intervals $T_n$ of drive pulses for the pulse motor in the digital valve stored in memory addresses corresponding to the number of the 10 divisions. The values of the pulse intervals $T_n$ (provided that n=0 to 9) may suitable be determined in conformity with the shape of a desired speed pattern of the pulse motor.

Figure 3:
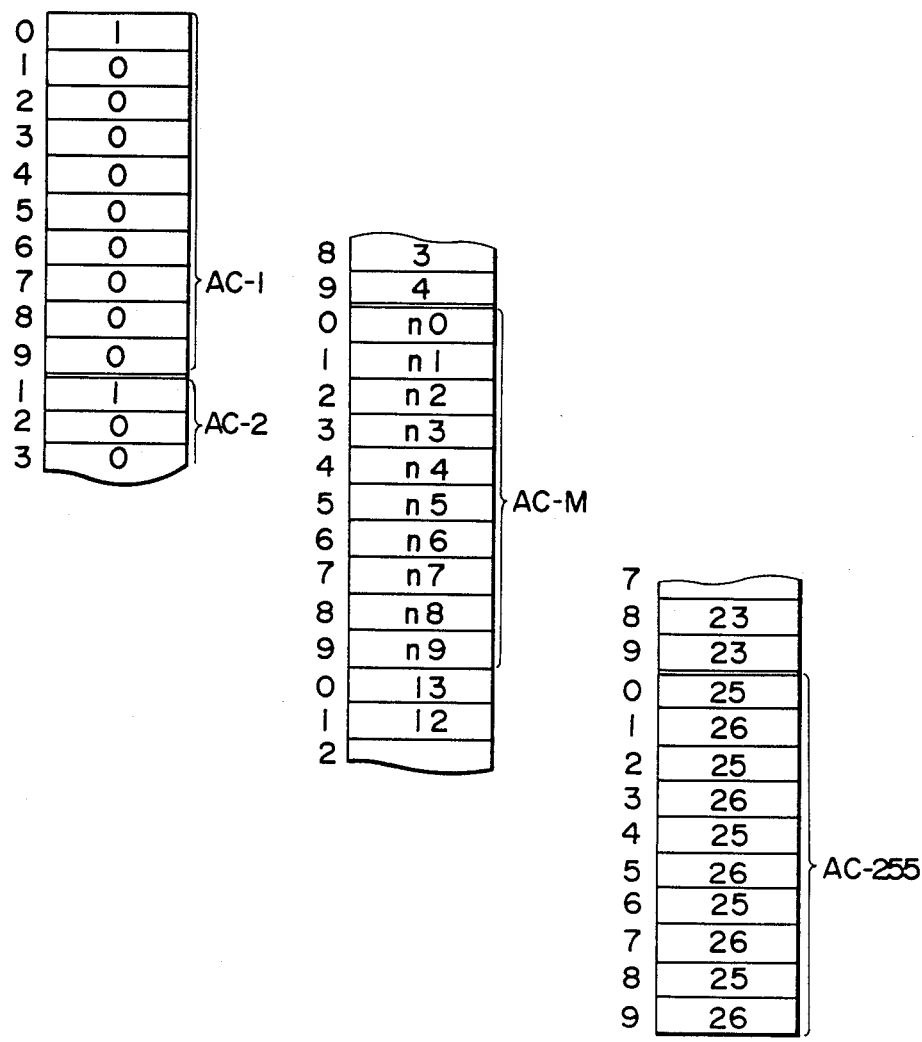
FIG. 3 is an explanatory view illustrating one example of the controlled variable table data of the present invention.

FIG. 3 is an explanatory view illustrating one example of the controlled variable table data used in the present invention. In this example, the maximum rotational displacement of the pulse motor corresponds to 256 steps. Therefore, 255 blocks shown by AC-1 to AC-255 within the range of from the case where the set opening M equals 1 (0.3%) to the case where M=256 (100%) are stored in advance as the controlled variable table data. When a desired value is set as the opening M in the opening setter 10 shown in FIG. 1, the corresponding block is selected.

FIG. 4 is an explanatory view illustrating one example of the period table data used in the present invention. In this example, 31 different control patterns are stored as blocks TS-1 to TS-31. Each of the blocks has ten divided addresses wherein pulse intervals $T_0$ to $T_9$ are respectively stored as typically shown in the block TS-K, and the pulse interval $T_n$ is stored in units of 10 μsec. as shown for the other blocks.

The switching control of the digital valve according to the present invention is effected in accordance with the controlled variable table data and the period table data shown in FIGS. 3 and 4. In case where the block AC-M in FIG. 3 and the block TS-K in FIG. 4 are selected, for example, $n_0$ pulses of the pulse interval $T_0$ are generated in the first division, $n_1$ pulses of the pulse interval $T_1$ in the second division, and so forth until $n_9$ pulses of the pulse interval $T_9$ are generated in the last division, thereby realizing the switching control of the digital valve corresponding to the set opening M and the set pattern K.

Figure 5:
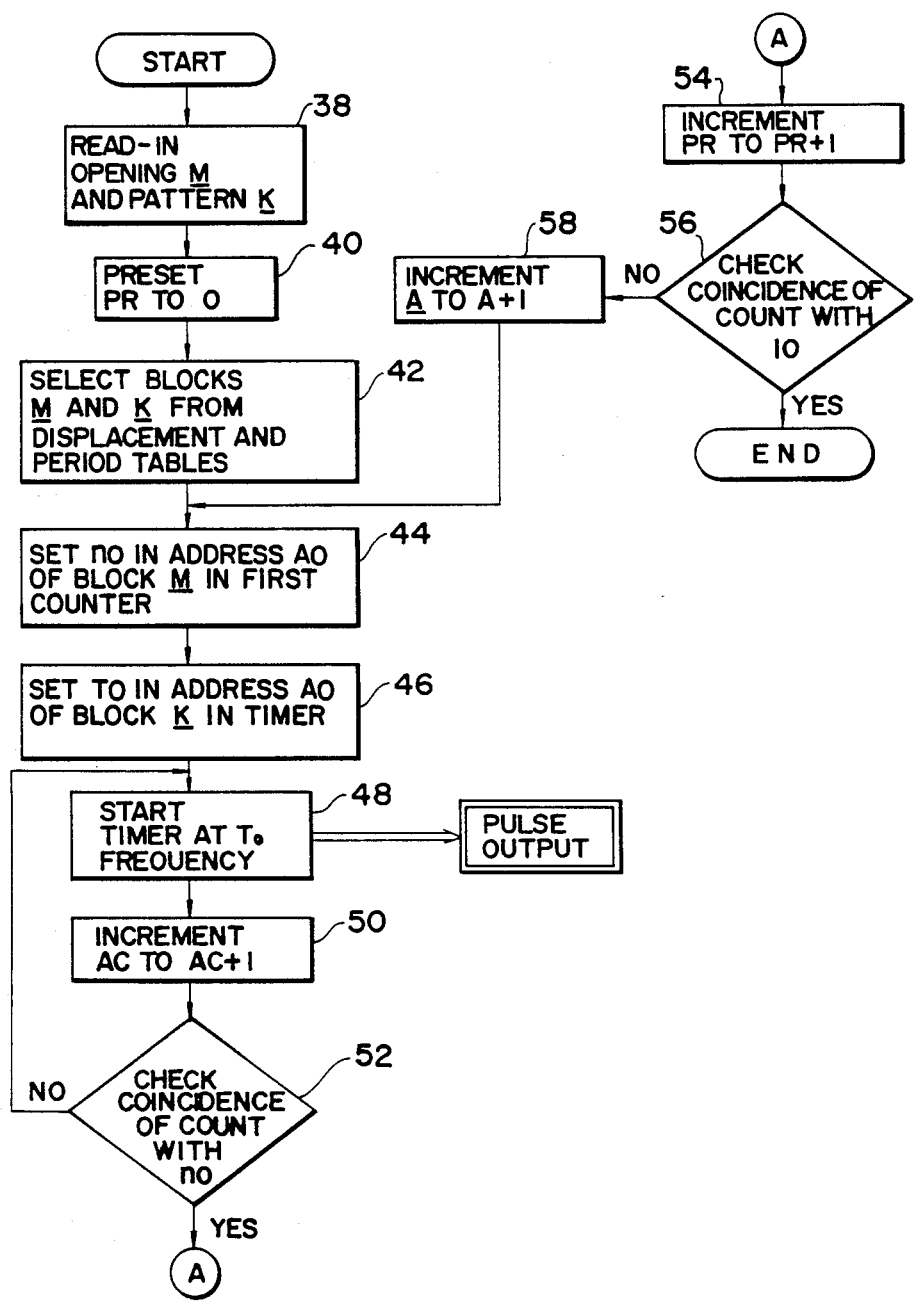
FIG. 5 is a flowchart illustrating the control operation of the embodiment shown in FIG. 1.

The operation of the embodiment shown in FIG. 1 will now be described with reference to the programming flowchart of FIG. 5.

At first, an operator sets a desired opening M by use of the opening setter 10 and selects and sets a desired control pattern from among the control patters prepared in the period table of the memory 20 by use of the pattern setter 12. After the desired opening M and pattern K have been set, as described above, they are read in a step 38. Then, a step 40 is executed in which the count PR of the second counter 24 is preset to 0. In a subsequent step 42, blocks M and K are selected from the controlled variable and period tables stored respectively in the memories 16 and 20. In a further subsequent step 44, the number $n_0$ of pulses stores in the first address $A_0$ of the selected block M in the controlled variable table is set in the first counter 22. The pulse interval $T_0$ stored in the first address $A_0$ of the selected block K in the period table is set in the timer 26 in a step 46. The timer 26 having the pulse interval $T_0$ set therein issues pulses of a uniform pulse width having the pulse interval $T_0$ as shown in a step 48. The pulses thus issued are supplied through the multiplexer 28 to the driver 30 to drive the pulse motor 34 of the digital valve 32 by one step in a preset in a preset rotational direction and, at the same time, the pulses from the timer 26 are also supplied to the first counter 22 to cause increment of the count thereof in a step 50. Subsequently, in a step 52, it is checked whether or not the count of the first counter 22 coincides with the pulse number $n_0$ which has been set in the step 44. When the count does not coincide with $n_0$, the routine is returned to the step 48 so that next pulses of the pulse interval $T_0$ are issued. Through the steps 48, 50 and 52, the timer 26 issues pulses successively until the pulse number coincides with the pulse number $n_0$ which has been set in the first counter 22 in the step 44.

When the count of the first counter 22 coincides with the set pulse number $n_0$ in the step 52, the first counter 22 produces a count output to cause increment of the count of the second counter 24 as shown in a step 54. A step 56 is then executed, in which it is checked whether or not the count of the second counter 24 coincides with the number of the 10 divisions. When the count of the second counter is less than 10, this means that the control has not yet been completed. In this case, therefore, a step 58 is executed, in which the address A is increased, and the routine is returned to the step 44, in which the pulse number $n_1$ in the address $A_1$ of the selected block M is set in the first counter 22 and the pulse interval $T_1$ in the address $A_1$ of the block K is set in the timer in the step 46. Subsequently, the steps 48, 50 and 52 are similarly repeated until $n_1$ pulses of the pulse interval $T_1$ are issued.

Likewise, pulses are issued from the timer 26 in accordance with the data stored in the following addresses $A_2$ to $A_9$ of the selected blocks M and K. When the issuance of pulses according to the data in the address $A_9$ is completed, the coincidence of the count of the second counter 24 with 10 is detected in the step 56, thus bringing the control based on the controlled variable and period tables to a termination.

Figure 6A:
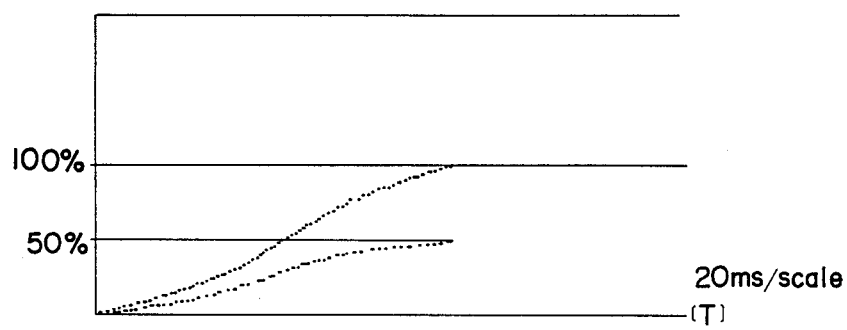
FIGS. 6A, 6B and 6C are record charts illustrating pulse motor control characteristics obtained according to the present invention.
Figure 6B:
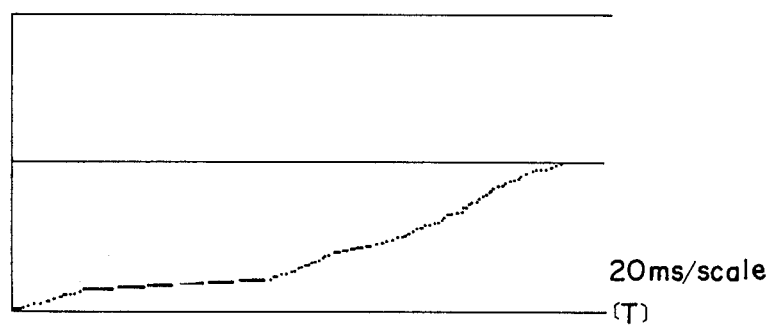
Figure 6C:
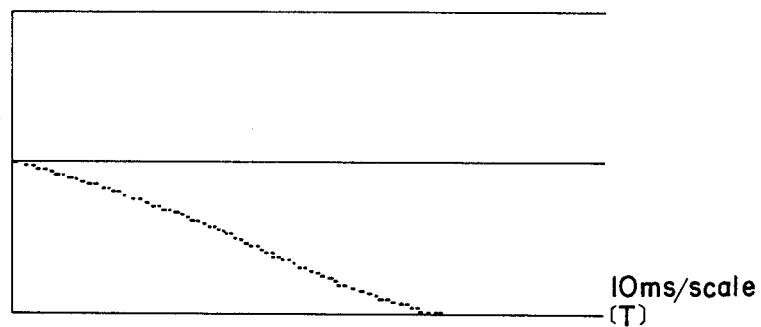

FIGS. 6A, 6B and 6C are record charts showing examples of the control patterns of the digital valve obtained by following the procedures of the aforementioned embodiment except that the number of the divisions N is set to be 16. The patterns shown in FIGS. 6A and 6B are obtained when the digital valve is opened, whereas the pattern shown in FIG. 6C is obtained when the digital valve is closed. As is clear from these patterns, according to the present invention, a desired control pattern can be generated to suit the type of the load being driven by the digital valve. Additionally, analogous control patterns can easily be obtained from one same pattern by changing the set opening alone. For example, 100% and 50% openings can be obtained in analogous control patterns as shown in FIG. 6A.

In the forementioned embodiment, the number of divisions of the set opening and that of the pulse interval have been set respectively to be 10. However, each of the numbers of the divisions may be appropriately changed. It may be increased when it is desired to increase the control precision, whereas when the control precision is not so significant, it may be decreased. From a practical point of view, it is the best mode to divide each of the set opening and the pulse interval into 16 divisions. Further, while the 255 different set opening data and 31 different pattern data based on the pulse intervals have been made available in the aforementioned embodiment, these numbers are by no means limitative in the present invention. Particularly as for the pattern, any desired number of patterns may be set within the memory capacity.

Furthermore, it is desirable to write some controlled variable table data and some time length table data in respective memories before shipment thereof so that a user may write desired table data in empty areas of the memories. In this case, a user may work out desired control patterns of a digital valve and write table data in memories while actually operating an apparatus with a pulse motor.

Supplementarily, the aforementioned embodiment has been referred to a digital valve for controlling the flow speed while varying the throttle by means of a pulse motor. However, a digital valve for controlling pressure while varying the load of a spring for setting relief pressure by means of a pulse motor is also applicable to the present invention.

FIG. 7 is a block diagram showing another embodiment of the controlling device according to the present invention, wherein a fluid-controlled valve, such as a servo valve, a proportional control valve, etc., controlled by analog signals is subjected to control by pulse outputs.

In FIG. 7, a controlled variable setter 100 corresponds to the opening setter 10 of the previous embodiment in FIG. 1 and is adapted to set a controlled variable of an analog fluid-controlled valve 62. A pattern setter 12, a pulse number generator 14, a memory 16 having controlled variable table data stored therein, a pulse period generator 18, a memory 20 having period table data stored therein, a first counter 22, a second counter 24, a timer 26 and a multiplexer 28 in this embodiment have the same construction and functions as those shown in the previous embodiment in FIG. 1.

The output of the multiplexer 28 in this embodiment is supplied to an up/down counter 58 which counts control pulses. This up/down counter 58 indicates its fullest count when the number of pulses corresponding to 100% controlled variable of the fluid-controlled valve 62 is counted, and is adapted to count up for CW pulses issued from the multiplexer 28 and to count down for CCW pulses issued from the multiplexer 28.

The count output of the up/down counter 58 is supplied to a digital-to-analog converter 60, wherein the digital data of the count of the up/down counter 58 is converted into an analog voltage signal or an analog current signal which is supplied to the fluid-controlled valve 62 as a control signal.

For example, a servo valve is used as the fluid-controlled valve 62 which is controlled by a converted signal issued from the digital-to-analog converter 60. The throttle degree of a flapper nozzle is varied by the function of a torque motor in response to the electrical input of either the voltage signal or the current signal issued from the digital-to-analog converter 60, and the fluid pressure or flow rate is controlled in accordance with the electrical input by a spool valve, etc. Thus, the fluid-controlled valve 62 per se includes a mechanical feedback system capable of responding to an electrical input.

Figure 8:
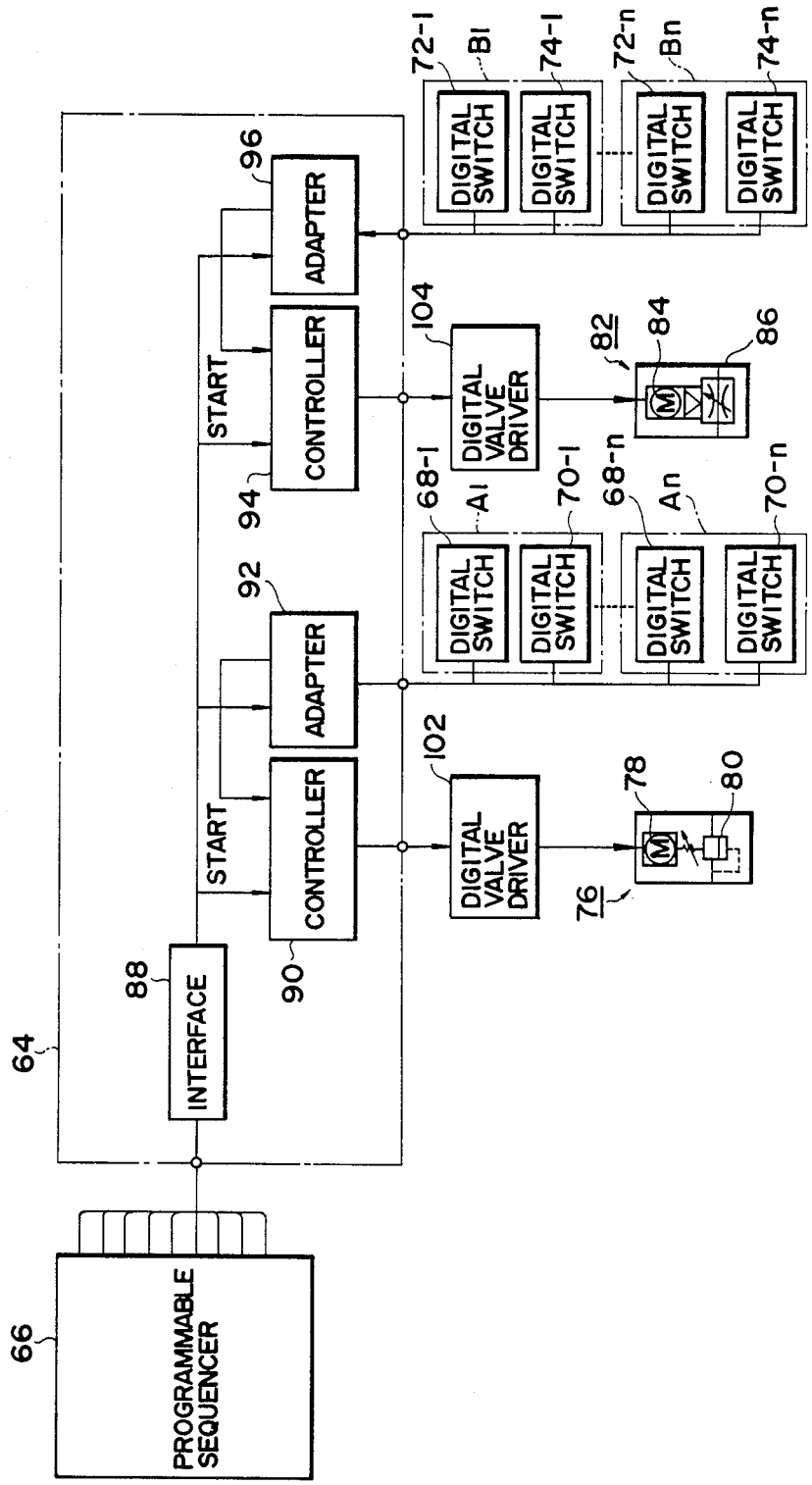
FIG. 8 is a block diagram illustrating still another embodiment of the present invention, which uses a programmable sequencer of a simple type.

FIG. 8 is a block diagram showing still another embodiment of the controlling device according to the present invention, in which a fluid-controlled valve is controlled by a simple-type programmable sequencer which specifies a controlled variable and a control pattern.

In FIG. 8, reference numeral 64 denotes a control unit which generates pulse signals for driving a pulse motor of a digital valve on the basis of table data. To the control unit 64 is connected a programmable sequencer 66 for setting control programs for the digital valve and issuing outputs to be supplied to the control unit 64. This programmable sequencer 66 does not have a function of converting a decimal-coded signal into a binary-coded signal. To the control unit 64 are also connected a plurality of sets of n digital switches which are composed of a set of 68-1 to 68-n, that of 70-1 to 70-n, that of 72-1 to 72-n and that of 74-1 to 74-n so that outputs of these digital switches may be supplied to the control unit 64. Groups of digital switches $A_1$ (composed of digital switches 68-1 and 70-1) to An (composed of digital switches 68-n and 70-n) serve to control the pressure. A set of digital switches 68-1 to 68-n are adapted to each set a pressure value corresponding to a desired control value, and a set of digital switches 70-1 to 70-n are adapted to each specify a control pattern between an initial pressure value and a set pressure value. On the other hand, groups of digital switches $B_1$ (composed of digital switches 72-1 and 74-1) to Bn (composed of digital switches 72-n and 74-n) are used for the purpose of controlling the flow rate. A set of digital switches 72-1 to 72-n are adapted to each specify the opening of a valve, and a set of digital switches 74-1 74-n are adapted to each set a control pattern between an initial opening and a set opening.

The outputs of control unit 64 is connected to digital valve drivers 102 and 104 by signal lines. The output of the digital valve driver 102 is supplied to a digital valve 76 for pressure control. The digital valve 76 has a construction such that spring load of a relief valve 80 is made variable by driving a pulse motor 78 to enable the relief pressure to be adjusted. The output of the digital valve driver 104 is supplied to a digital valve 82 for flow rate control. The digital valve 82 is provided with a throttle 86 the opening of which is adjusted by a pulse motor 84. It goes without saying that the digital valve drivers 102 and 104 have functions of converting the pulse signals from the control unit 64 into electric currents for giving rotating magnetic fields to the pulse motors 78 and 84 and then issuing converted outputs, respectively.

In the control unit 64, controllers 90 and 94 are provided relative to the pressure control digital valve 76 and the flow rate control digital valve 82. Command signals from the programmable sequencer 66 disposed outside the control unit 64 are inputted to the control unit 64 and supplied to the controllers 90 and 94 via an interface 88, with the result that the controllers 90 and 94 cause the valves to be actuated in accordance with the given operation programs based on the command signals. On the other hand, the digital switches 68-1 to 68-n and 70-1 to 70-n of the groups $A_1$ to An and the digital switches 72-1 to 72-n and 74-1 to 74-n of the groups $B_1$ to Bn are connected respectively to adapters 92 and 96 provided respectively for a pressure control circuit and for a low rate control circuit. These adapters 92 and 96 receive the decimal-coded signals set by all of the digital switches, and convert the signals into binary-coded signals, and supply the converted signals to the controllers 90 and 94 respectively. That is to say, the adapters 92 and 96 supply respectively to the controllers 90 and 94 a table block number corresponding to a desired control pressure set by the digital switches 68-1 to 68-n or a desired opening set by the digital switches 72-1 to 72-n and another table block number corresponding to a control pattern set by the digital switches 70-1 to 70-n or a control pattern set by the digital switches 74-1 to 74-n.

Figure 9:
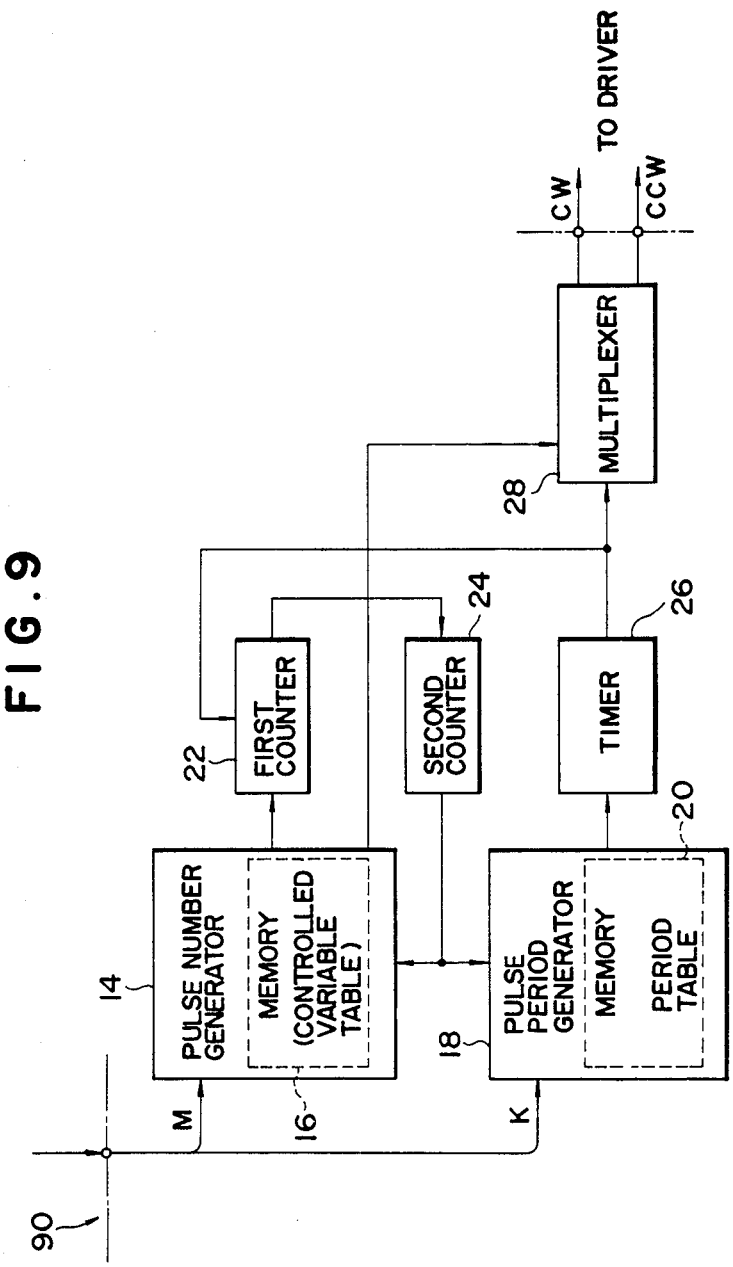
FIG. 9 is a block diagram illustrating the construction of the controller shown in FIG. 8.

FIG. 9 is a block diagram showing one example of the controllers 90 and 94 in FIG. 8, which is referred to the controller 90 for pressure control as a typical one.

The controller 90 is provided with a pulse number generator 14, a memory 16 having controlled variable table data stored therein, a pulse period generator 18, a memory 20 having period table data stored therein, a first counter 22, a second counter 24, a timer 26 and a multiplexer 28 which are identical to those of the first embodiment shown in FIG. 1. The controlled variable M converted into a binary-coded signal by the adapter 92 in FIG. 8 is inputted to the pulse number generator 14, and the control pattern K converted into a binary-coded signal is inputted to the pulse time length generator 18. The output of the multiplexer 28 is supplied to the digital valve driver 102 in FIG. 8. The generator of pulses on the basis of the set controlled variable M and the set control pattern K is carried out in the same manner as in the first embodiment shown in FIG. 1.

The third embodiment will be described concerning the function thereof more specifically with reference to FIGS. 8 and 9.

Pressure relative to the pressure control digital valve 76, a flow rate relative to the flow rate control valve 82, a control pattern between an initial pressure and a set pressure, and a control pattern between an initial flow rate and a set flow rate are set by means of the digital switches 68-1 to 74-n of the groups $A_1$ to An and $B_1$ to Bn and, at the same time, switches for use in pressure control and flow rate control are selected from the groups $A_1$ to An and $B_1$ to Bn by means of the programmable sequencer 66. The outputs from the digital switches 68-1 to 74-n having set the pressure, flow rate and control patterns as described above are supplied to the adapters 92 and 96 of the control unit 64 to be there converted into binary-coded signals.

Subsequently, when the starting switch (not shown) of the programmable sequencer 66 is operated, command signals pass through the interface 88, select digital switches, and are supplied to the controllers 90, 94 and the adapters 92, 96. When a combination of the group $A_1$ consisting of the digital switches 68-1 and 70-1 with the group $B_1$ consisting of the digital switches 72-1 and 74-1 are selected, for example, a valve-opening command is given to the controller 90 and simultaneously, the adapter 92 converts the pressure and control pattern which have been set by the digital switches 68-1 and 70-1 of the group $Aa_1$ into binary-coded signals being supplied to the controller 90 in accordance with the prescribed programs of the programmable sequencer 66. The signals from the adapter 92 become signals for specifying a block number M of the controlled variable table data stored in the memory 16 of the pulse number generator 14 and a block number K of the period data stored in the memory 20 of the pulse period generator 18, as shown in FIG. 9. After the blocks of the controlled variable table and time length table data in the controller 90 have been specified as described above, the pressure control digital valve 76 is controlled in accordance with the flow-chart shown in FIG. 5.

In accordance with the prescribed programs of the programmable sequencer 66, flow rate control commands are also given. In this case, the flow rate control digital valve 82 is controlled on the basis of the blocks of the controlled variable table and period table data specified by the digital switches 72-1 and 74-1 of the group $B_1$ in the same manner as described above.

Figure 10:
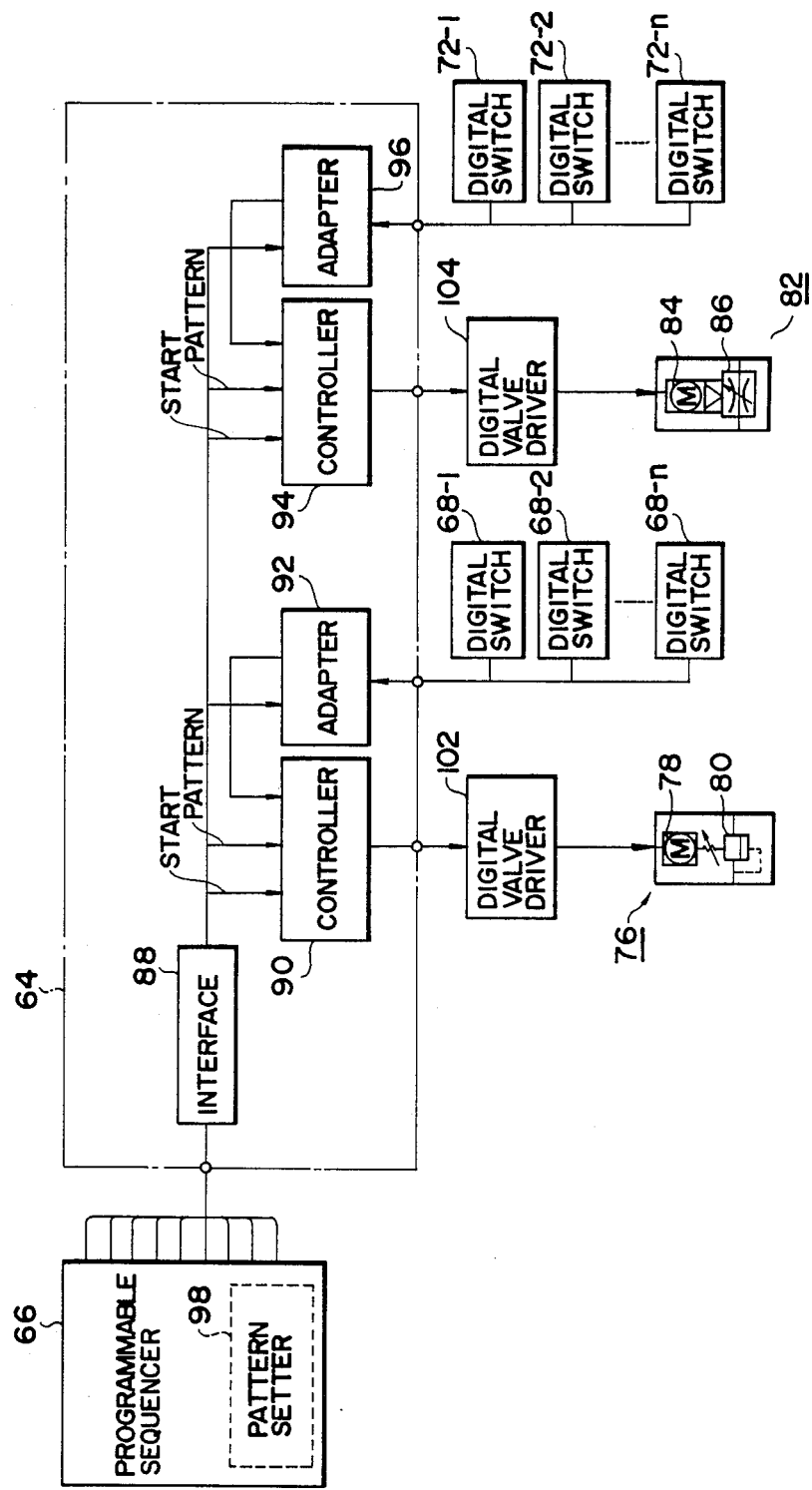
FIG. 10 is a block diagram illustrating yet another embodiment of the present invention, which adopts a programmable sequencer.

FIG. 10 is a block diagram showing yet another embodiment of the controlling device according to this invention. This embodiment is characterized by adopting digital switches 68-1 to 68-n and 72-1 to 72-n respectively for pressure setting and flow rate setting relative to adapters 92 and 96 in a control unit 64, and providing a programmable sequencer 66 with a pattern setter 98 for setting control patterns. The other constructions in this embodiment are identical with those of the third embodiment in FIG. 8.

When this device is started, therefore, a start signal and pattern selection signals are supplied from the programmable sequencer 66 to an interface 88 in the control unit 64 and, at the same time, switch selection signals are supplied to the adapters 92 and 96. When the digital switches 68-1 and 72-1 are selected, for example, pressure and a flow rate are set in the controllers 90 and 94, and control of a pressure control digital valve 76 and a flow rate control digital valve 82 is effected in accordance with the table data stored in the controllers 90 and 94.

The third and fourth embodiments shown in FIGS. 8 and 10 use the controlling devices which utilize the programmable sequencers not having functions of converting a decimal-coded signal into a binary-coded signal and issuing a converted signal. However, the control unit 64 may be constructed such that either a programmable sequencer not having the aforementioned functions or one having the functions may be interchangeably connected thereto and, even when a programmable sequencer having the functions is connected to the control unit, the controlling device thus constructed can control a digital valve on the basis of table data to be carried out.

What is claimed is:

1. In a fluid valve control system comprising a setting means for setting a desired flow rate or pressure of fluid and a desired control pattern, a pulse generating means for generating pulse signals corresponding to a controlled variable and a control pattern set by said setting means, and an actuating means for actuating said fluid valve in accordance with the pulse signals generated by said pulse generating means, the improvement comprising:

a first memory means for storing a plurality of different pulse number data blocks corresponding in number to a number of control pulses required for a maximum controlled variable of said fluid valve, each of said pulse number data blocks consisting of pulse number data obtained by dividing a given number of control pulses corresponding to the controlled variable of said fluid valve by a number N, said pulse number data being stored in N divisions such that a sum of pulse numbers stored in the respective divisions is equal to said given number of control pulses; and a second memory means for storing control pattern data consisting of a plurality of different pulse period data blocks, each of said pulse period data blocks consisting of pulse period data stored in N pulse period divisions corresponding to said N divisions:

wherein said pulse generating means includes:

a timer means in which pulse period data $T_0$ to $T_{N-1}$ of the respective pulse period divisions $A_0$ to $A_{N-1}$ in a specified pulse period data block stored in said second memory means are preset one after another, wherein said timer means issues pulses of preset pulse periods;

a first counter in which pulse number data $n_0$ to $n_{N-1}$ of the respective divisions $A_0$ to $A_{N-1}$ in a specified pulse number data block stored in said first memory means are preset one after another, wherein said first counter counts said pulses issued from said timer means and produces an output whenever the counter coincides with a preset pulse number; and a second counter for presetting, in response to a count output of said first counter, the pulse number data and pulse period data of the next divisions in said first counter and said timer means, respectively, wherein said second counter inhibits the issuance of pulses when its count coincides with the number N of divisions.

2. A fluid valve control system according to claim 1, wherein said setting means includes:

a controlled variable setter for selecting the controlled variable of said fluid valve by specifying a block number of any of said pulse number data blocks stored in said first memory means; and a pattern setter for selecting the control pattern of said fluid valve by specifying a block number of any of said pulse period data blocks stored in said second memory means.

3. A fluid valve control means according to claim 1, wherein said actuating means includes:

a multiplexer for outputting output pulses of said pulse generating means as CW pulses or CCW pulses in accordance with a direction in which said fluid valve is to be controlled; and a pulse motor for varying the flow rate or fluid pressure of said fluid valve in accordance with said output pulses of said multiplexer.

4. A fluid valve control system according to claim 1, wherein said actuating means includes:

a counting means for effecting addition or subtraction of the output pulses of said pulse generating means in accordance with a specified control direction; and a digital-to-analog converter for converting a count output of said counting means into an analog signal and for supplying said analog signal to an actuator for said fluid valve.

5. A fluid valve control system according to claim 1, wherein said setting means includes:

a programmable sequencer for commanding control programs of said first valve;

at least one digital switch for setting the controlled variable and control pattern or said fluid valve in the form of decimal-coded signals; and an adapter for converting the controlled variable or the control pattern set in the form of decimal-coded signals by said at least one digital switch into binary-coded signals and for supplying said binary-coded signals to said pulse generating means;

said adapter being disposed within a control unit provided with said first memory means, second memory means andd pulse generating means, and said programmable sequencer and said at least one digital switch being disposed on an operating panel and connected to said control unit by signal lines;

said programmable sequencer being provided with a means for outputting a signal for selecting said at least one digital switch connected to said adapter such that an output of said at least one digital switch is inputted to said adapter.

6. A fluid valve control system according to claim 5, wherein said adapter is connected to said at least one digital switch so as to only set the controlled variable of said fluid valve, and said programmable sequencer is provided with a means for setting the control pattern of said fluid valve.

* * * * *